Aug. 15, 1950     H. W. SIMPSON     2,518,825

TRANSMISSION

Filed June 27, 1946     6 Sheets-Sheet 1

INVENTOR.
HOWARD W. SIMPSON.

ATTORNEYS.

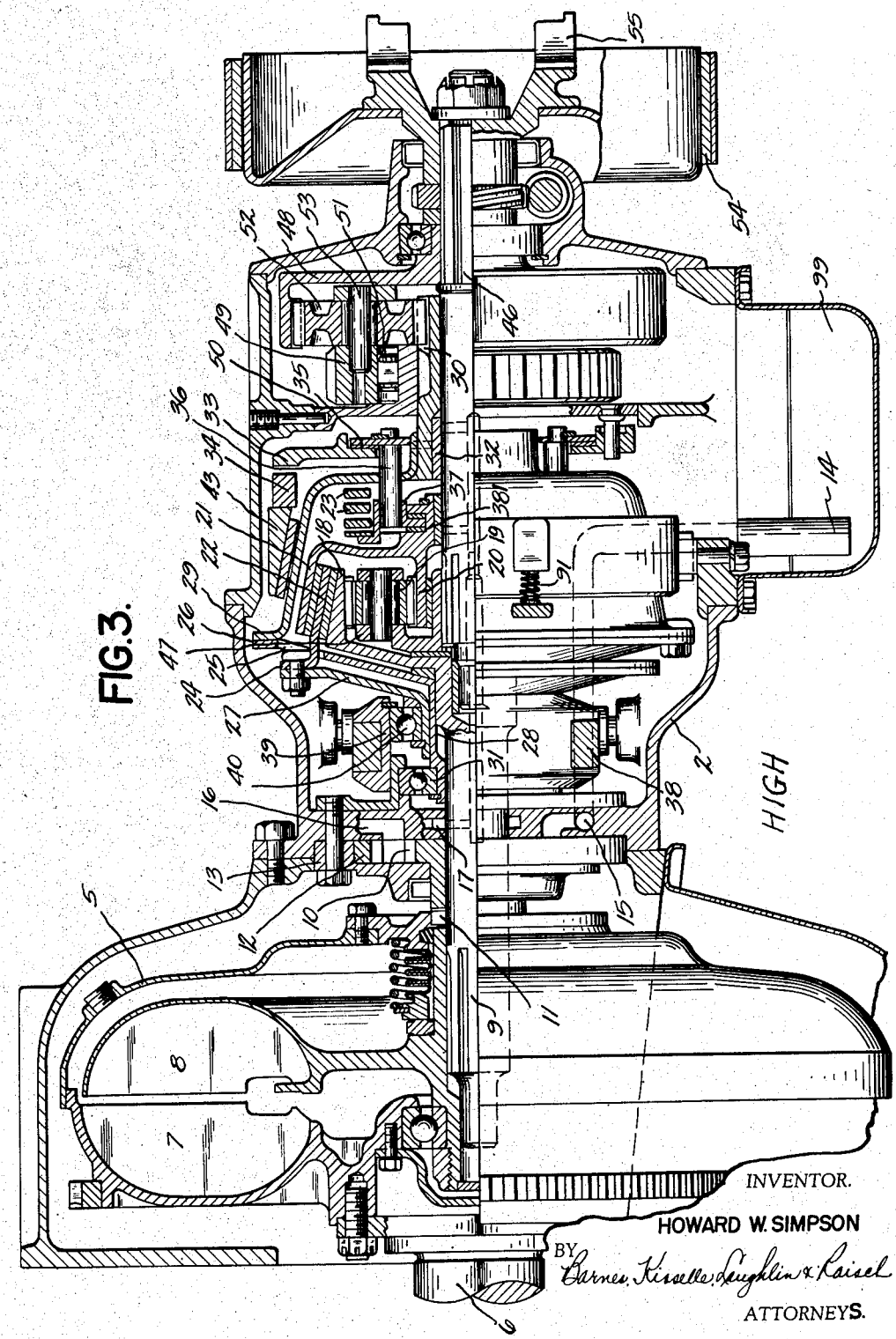

Aug. 15, 1950 H. W. SIMPSON 2,518,825
TRANSMISSION
Filed June 27, 1946 6 Sheets-Sheet 3

INVENTOR.
HOWARD W. SIMPSON

BY
Barnes, Kisselle, Laughlin & Raisch
ATTORNEYS.

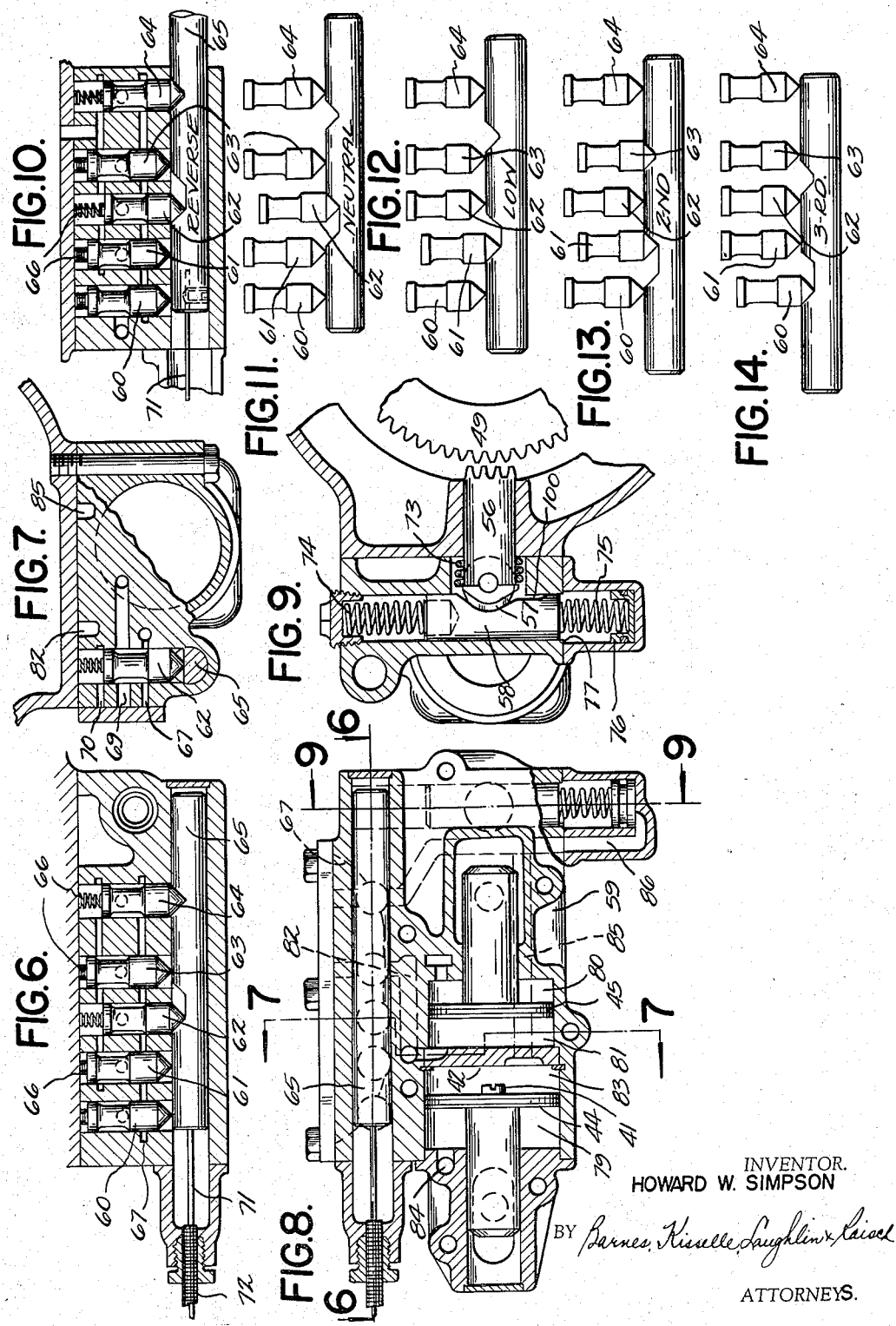

Aug. 15, 1950      H. W. SIMPSON      2,518,825
TRANSMISSION
Filed June 27, 1946      6 Sheets-Sheet 5
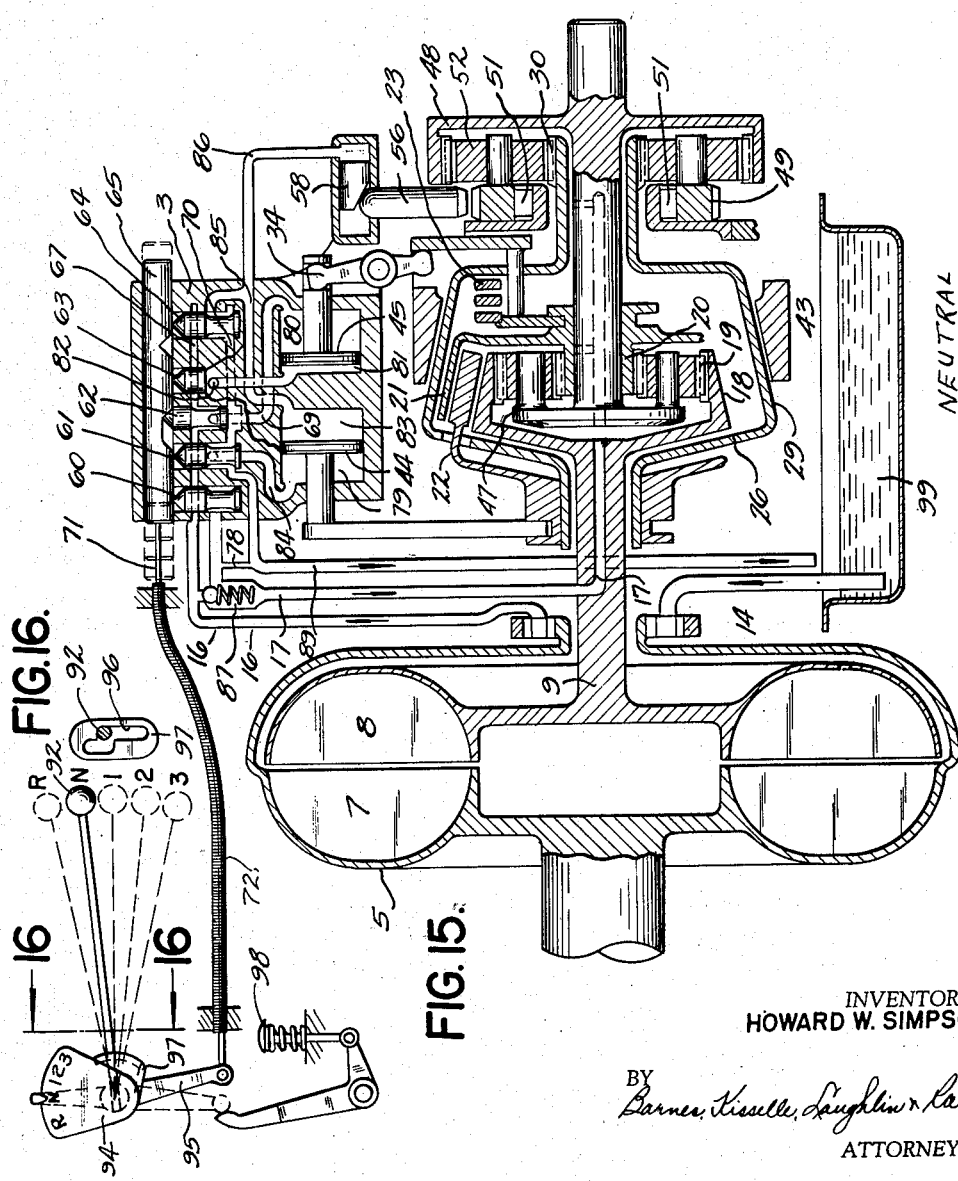
INVENTOR.
HOWARD W. SIMPSON
ATTORNEYS.

Aug. 15, 1950  H. W. SIMPSON  2,518,825
TRANSMISSION
Filed June 27, 1946  6 Sheets-Sheet 6
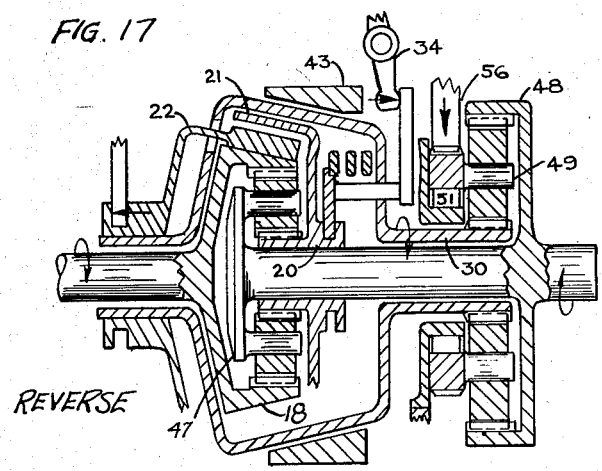
FIG. 17 — REVERSE
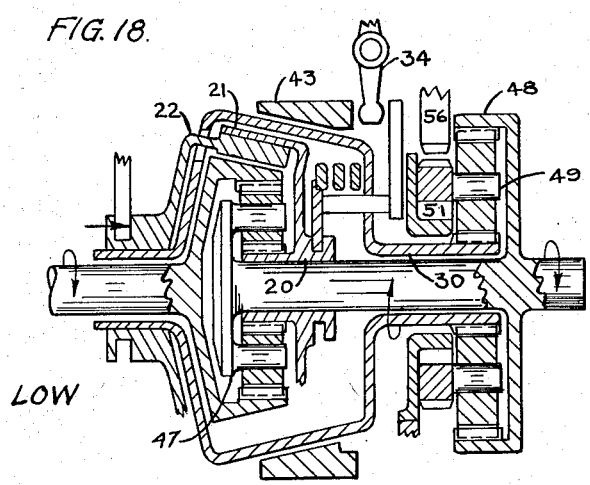
FIG. 18 — LOW
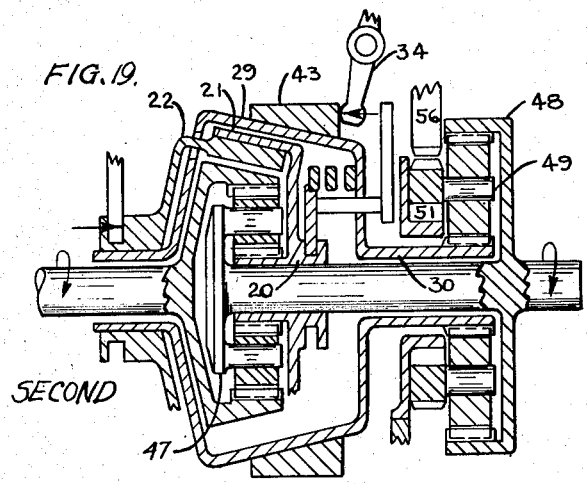
FIG. 19 — SECOND
INVENTOR.
HOWARD W. SIMPSON
BY
ATTORNEYS.

Patented Aug. 15, 1950

2,518,825

UNITED STATES PATENT OFFICE 2,518,825

TRANSMISSION

Howard W. Simpson, Dearborn, Mich.

Application June 27, 1946, Serial No. 679,821

17 Claims. (Cl. 74—763)

This invention relates to a transmission for an automotive vehicle.

Planetary transmissions developed heretofore have not found wide acceptance. A disadvantage has been the use of multiple disc clutches having many plates causing drag when released and idling and the heat developed by these discs dragging or slipping causing warpage, especially when the vehicle is moving while the control means is not operating properly. Such clutches require drilled passages registering with ports in rotating cylinders that energize the clutches. This is costly, bulky and requires full pressure at all times to make the transmission operate.

My transmission obviates the above as it has all of the hydraulic mechanism, except the pump, in a single detachable unit. This keeps the rotating mechanism simple and light. By the use of a spring, the rotating clutch is operated without use of rotating hydraulic mechanism and in direct drive the hydraulic operating means is cut out all together, and the spring engages the clutch.

Thus in high gear the oil flow is bypassed and it is unnecessary for the pump to build up pressure with the attendant heat and power loss. This also gives the advantage of being able to push the car to start the engine. There being no oil pressure when the engine is stopped, the transmission is automatically in direct drive and so the engine can be started by pushing the car, if desired.

Another advantage in my transmission is that no special gears are required for low. There are two planetary trains, one for second and one for reverse. When both are connected a differential drive is obtained to produce a low speed ratio. In effect the reverse gear planetary unit acts upon the second gear planetary set in such a way as to slow the second speed ratio down to a low speed ratio. In conventional transmissions each gear ratio requires a special set of gears and these only work while in that particular gear ratio. This means that there are always some gears idling in every speed.

In my transmission no gears are idling in low and high. In low every gear in the transmission is working and the design is such that the tooth loads are approximately equal on all gears. This makes for long life and compactness and the most efficient use of gearing possible in any transmission of any type. By having all the gears working in low, every gear carries a load when the vehicle is pulling the hardest.

A small unit is obtained as there are no gears idling, and thus useless, in the lowest ratio. In most transmissions where power is transmitted through more than one set of gears this is done by compounding. In this disclosure two sets of planetary gears are used for low, but instead of multiplying the torque in the first set and then passing the multiplied torque through the second set of gears, my transmission splits the torque at the first set so that only about half of it goes through each set of gears.

A principal object of this invention is to provide a simple compact hydraulic control unit separate from the main part for ease of installation and replacement. This contains both valves and servo-cylinders and no piping is therefore necessary.

Another object is to provide a simple manual control for all speeds including reverse by means of a single Bowden wire.

Another object is to provide silent, quick forward shifts either up or down at any speed, load or on any grade without shock or clashing any teeth and without a foot pedal.

Another object is to provide an automatic arrangement to prevent backing up of the vehicle whenever the engine stalls while the vehicle is on a hill.

Another object is to provide a safety engagement of reverse by providing a toothed pin that can only be engaged at a very slow vehicle speed or when stationary, and which will not engage or cause wear or damage if engagement is attempted at a higher speed.

Another object is to provide for pre-selection of low speed while in second or high and at a fast vehicle speed without shock or effort.

The hydraulic or servo units actuate cone clutches and a brake to obtain the various speeds through the medium of two forks and since the entire control consists of a single Bowden wire, this transmission is well adapted for remote control of rear or under body mounted power plants.

A fluid coupling is shown with the transmission but since the transmission itself contains a disconnecting clutch the fluid coupling is not a necessity but preferably an added feature where extremely smooth application of power is desired.

Referring to the drawings:

Fig. 3 is a vertical section on the center axis through the fluid coupling, oil pressure pump, clutch brake, gears, etc. and shows the transmission in high speed.

Figs. 6 to 9 show in detail the construction of the servo unit.

Figs. 10 to 14 show the valves moved to the various speed positions by means of the Bowden wire operated notched actuating rod.

Fig. 15 is a diagram showing the hydraulic actuating and lubricating circuits as well as the gears, clutch, brake and fluid coupling in simplified form and shows the transmission in neutral.

Fig. 16 is a section along the line 16—16 of Fig. 15.

Figs. 17, 18 and 19 show the transmission in reverse, low and second speed respectively.

Figure 1:
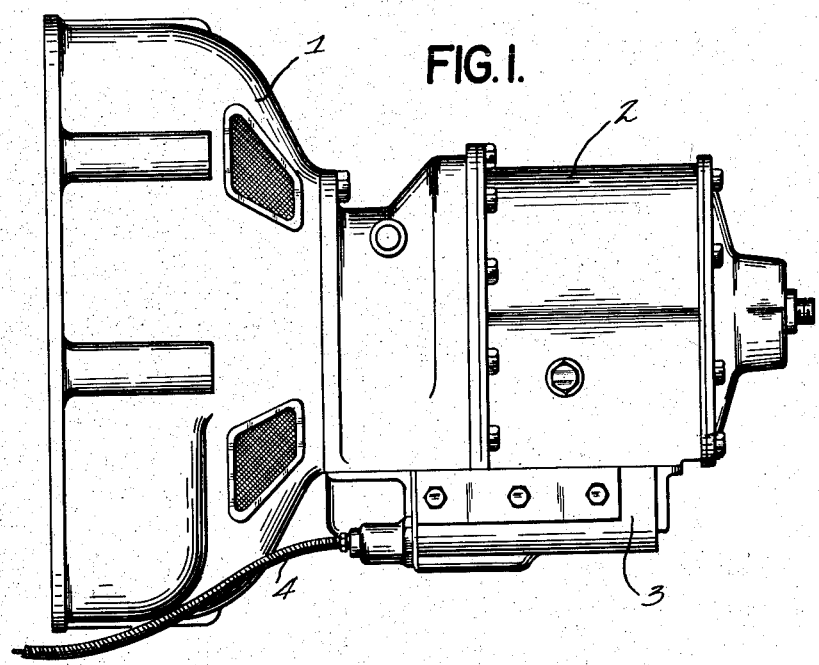
Figs. 1 and 2 are external top and left side views respectively.
Figure 2:
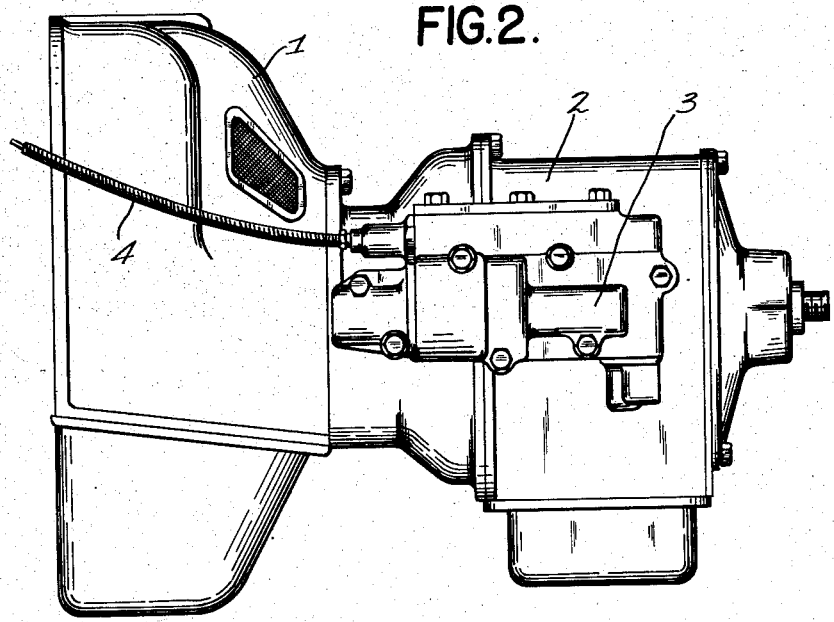

Figs. 1 and 2 show the bell housing 1 enclosing the fluid coupling, a transmission housing 2 and a servo unit 3 attached to the side. A Bowden wire 4 operates the valves from a lever 92 (Fig. 15) on the steering column.

In Fig. 3 a fluid coupling 5 is attached to the engine crankshaft 6. Impeller 7 drives the runner 8 by means of the fluid with which the coupling is partially filled. This fluid cushioned drive is transmitted through drive shaft 9 to the gears. A direct drive from impeller 7 to the oil pump gear 10 is obtained by a slot and tongue drive at 11. The mating gear 12 of the pump is supported in pump housing 13 eccentric to the drive shaft. The inlet pipe 14 supplies oil to the pump through passage 15 in the transmission housing 2 and the outlet oil from the pump passes through passage 16 past a relief valve 87 (Fig. 15) to the servo unit 3. When the desired pressure is reached, the relief valve 87 opens thus supplying oil under reduced pressure to passage 17 (Fig. 15) connecting to the hollow drive shaft 9 where the oil is free to flow rearwardly to lubricate the transmission.

The drive shaft 9, integral with ring gear 18, drives planets 19 and sun gear 20 which has a cone clutch element 21. The teeth of the gears 18, 19, 20 are helically cut and therefore exert an end thrust. The helix angle of sun gear 20 is such that when the engine is driving the transmission the end thrust developed at the sun gear tends to push it forward or to the left in Fig. 3 and this thrust assists the spring in engaging the cone clutch and allows the use of a weaker spring than would otherwise be required. An inner clutch member 22 has an inner and outer friction lining one of which engages the sun gear cone 21 and the other of which engages ring gear 18 under the pressure of spring 23 thus locking these gears against relative rotation. The clutch member 22 has several legs or ears 24 which pass through holes 25 in plate 26 and the ears are bolted to supporting plate 27 which is supported and free to slide on the sleeve portion 28 of plate 26. Cone clutch member 22 drives plate 26 and brake drum 29 to which plate 26 is bolted and also the rear sun gear 30 by means of contact of the several ears 24 of cone 22 on the edges of holes 25 in plate 26, but endwise motion is permitted without moving drum 29 and parts attached to it endwise. Plate 26 and drum 29 are supported by bearing 31 and bushing 32.

Figure 5:
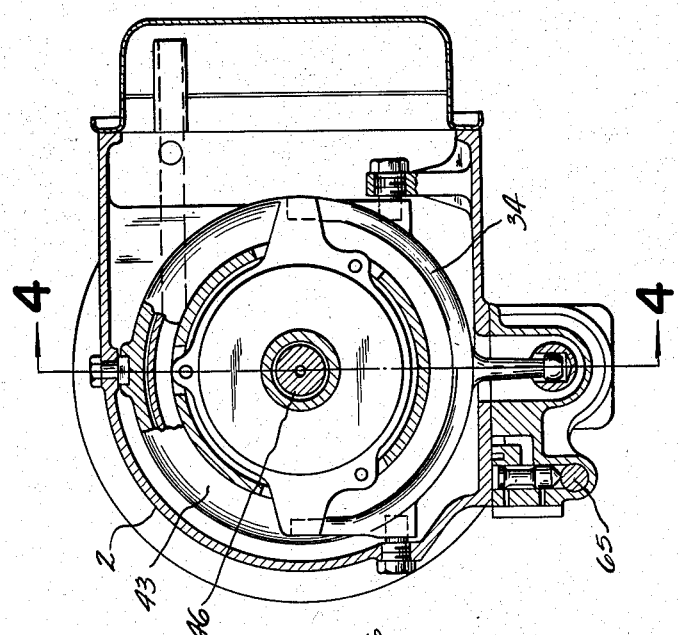
Fig. 5 is a section on line 5—5 of Fig. 4 showing the rear fork which operates the second speed brake in one direction and the clutch spring release bearing in the other.
Figure 4:
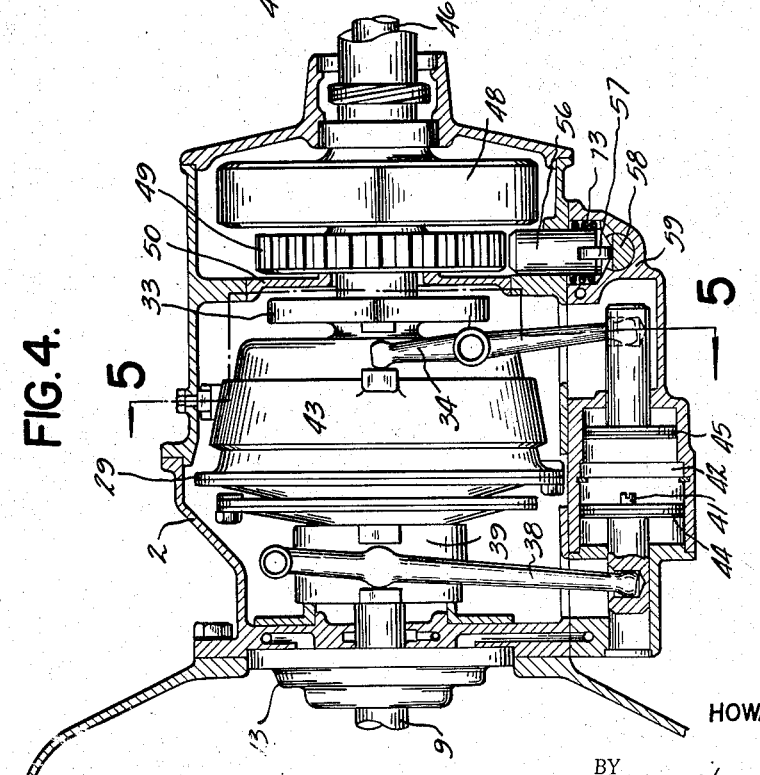
Fig. 4 is a section on line 4—4 of Fig. 5 showing actuation of the clutch and brake by the servo unit.

In order to release the cone 21 from clutch 22 a pressure plate 33 can be pushed rearwardly by means of the fork 34 shown in section Fig. 3 but shown fully in Figs. 4 and 5. This bears against thrust bearing 35 moving pins 36 and compressing spring 23 and shifting the sun gear 20 and cone 21 rearwardly. Drum 29 and clutch 22 are thereby disconnected from the engine and planets 19 and sun gear 20 spin idly.

Before compressing spring 23 in the above manner its pressure was being transmitted through plate 37 and thrust washer 381 to the hub of the sun gear but there being no relative motion between the sun gear and plate 37, there was no friction at these washers 381. When the spring is released however, the load is removed from washer 381 but relative rotation now occurs as the sun gear continues to turn but plate 37 stops.

Still referring to Figs. 3 and 4, supporting plate 27 can be moved axially in either direction by fork 38, bearing carrier 39 and bearing 40. When moved to the right or rear, clutch member 22 disengages from ring gear 18 and moves cone 21 thus compressing the spring 23 until piston set screw 41, shown in Figs. 4 and 8, touches cylinder head 42. This condition occurs in both low and second speed, as shown in Figs. 18 and 19, and in low it drives rear sun 30 backward thus putting part of the torque through the rear set of gears. In second the rear set of gears idle but the drive is transmitted to drum 29 as in low so that it may become a reaction member by applying brake 43. In reverse gear the fork 38 is pushed forward by the piston 44 and the clutch 22 engages ring gear 18. At the same time the rear fork 34 is made to disengage cone 21 from clutch 22 by movement of piston 45. The full engine torque is then driving clutch 22, plate 26, drum 29 and sun 30.

The driven shaft 46 of the transmission is integral with front carrier 47 and rear ring gear 48 and is piloted at its front end into drive shaft 9. The rear carrier 49 is supported on hub of plate 50 which is locked in the housing.

Piston 45 is linked to fork 34 to not only release the clutch by compressing the spring as described but also to move in the opposite direction to apply brake 43 which results in second speed. Figs. 6 to 14 show details of valves and pistons which operate the two forks and the reverse dog all of which are mounted in servo housing 59.

One or two of five spool valves 60, 61, 62, 63, 64 are open whenever one or both of the two notches in rod 65 is moved under the conical end of one of the valves. Each valve is urged toward the rod by a spring 66. In the housing a pressure slot 67, communicating with the pump supplies oil under pressure to this slot. When a notch in the valve rod allows a valve to move, the oil pressure is connected to a passage such as 69, Fig. 7, which feeds to one of the cylinders. When the valve 62 is not in a notch, however, the passage 69 is then connected with exhaust slot 70 which drains the cylinder back into the sump of the transmission. Pressure slot 69 is common to all the valves but exhaust slot 70 is common to all except valve 60.

Figs. 10 to 14 show the valves that are open for each speed. The valve rod 65 is moved by means of a flexible wire 71 enclosed in conduit 72.

A roller bearing and one way brake 51 which supports the rear carrier 49 permits it to rotate forward but not backward. Planets 52 run on pins 53. Parking brake 54 and universal joint 55 are mounted on the driven or tail shaft.

Figs. 4 and 9 show the reverse dog 56 which is moved inward to mesh with the teeth of carrier 49 for reverse speed only. This dog has a roller 57 resting in a notch in plunger 58. A return spring 73 urges the roller into the notch of the plunger which is moved, when reverse speed is selected, by piston 76 moving against spring 75. Balance spring 74 exerts a compressive load upon the other end of plunger 58 to thus allow only a fraction of the load on piston 76 to be transmitted to the dog. By this positive limitation of the force with which the dog engages the carrier teeth no damage can result and engagement will be prevented if the carrier is rotating at an appreciable speed, as the dog teeth will drag only very lightly on the carrier teeth. Should the teeth be prevented from engaging by coming together top to top, the piston 76 moves up against stop shoulder 77 but cannot bear directly on plunger 58.

However, since the forward piston 44 is energized at the same time, torque will be transmitted to the rear set of gears which will tend to rotate the carrier 49 forward but as soon as it moves enough for the dog teeth to come into engaging position it jumps in and locks the carrier and becomes the reaction member for reverse speed.

When the teeth on dog 56 are fully engaged, the roller rests on flat 100 and the separating force of the teeth cannot disengage the teeth or react against spring 75 to move plunger 58 back to its original position.

Note that valve 60 in Fig. 15 is not connected to the exhaust slot 70 because this valve does not feed a cylinder but merely bypasses oil around the relief valve 87 when in high speed so as to reduce the power required by the pump since no oil pressure is required in high except enough to lubricate the bearings. Since the restriction of the bearings in the transmission offers a resistance, a relatively high pressure would be built up at fast engine speeds. Therefore, a bleed passage 78, Fig. 15, is provided to drain off part of the oil from lubrication purposes and direct it to the sump 99. The area of this bleed is such that the oil pressure is kept below 20 pounds per square inch at all speeds, and yet sufficient pressure is obtained at low speeds for ample lubrication.

Referring to Figs. 6 to 15, valve 61 feeds cylinder space 79 through passage 84, when in first and second speed. Valve 62 feeds cylinder space 80 in neutral and reverse through passage 69. Valve 63 feeds cylinder space 81 when in second speed through passage 82. Valve 64 in reverse feeds cylinder space 83 through passage 85 and also the small cylinder in which piston 76 (Fig. 9) is located through passage 86. Relief valve 87 prevents oil pressure rising above the desired value by opening and directing surplus oil to lubrication through passage 17.

Referring to Fig. 15, operation of the transmission is as follows: With the selector lever at neutral, as shown, and the engine stopped, there is no oil pressure and the clutch spring 23 has locked the clutch in high or direct drive. The operator starts the engine and pressure begins to build up by the pump being turned over by the starter so that even with a warm engine and quick start, pressure has already begun to build up before the engine starts. As the engine starts the pressure rises to the value determined by the relief valve 87 because the fluid coupling housing 5 drives the pump gears 10 and 12 directly and not through the fluid. The runner 8 and drive shaft 9 however do not turn at once because they are driven through the fluid.

By the time the fluid begins to drive input shaft 9 the oil pressure has already been directed through passage 18 to valve 62 and thence to cylinder space 80 thus rocking fork 34 and releasing the clutch cone 21 so that this clutch cone and planet pinions 19 are the only parts which turn when in neutral. When shifting to first speed, valve 62 closes allowing cylinder space 80 to drain oil into the sump through slot 70 and passage 69 and at the same time valve 61 opens thus energizing piston 44 and engaging clutch 22 with cone 21. Fig. 18 shows my transmission in low gear. Since the carrier 47 is attached to the output shaft it offers a resistance. Planets 19 therefore rotate as idler gears in the stationary carrier and thus turn the sun 20 and cone 21 backward. This transmits the backward rotation of sun 20 to sun 30 which attempts to turn carrier 49 backward due to the resistance of ring gear 48 which is fixed to the tail shaft. But the carrier is prevented from rotating backward by one-way brake 51, consequently ring gear 48 is forced to rotate forward. At the same time the front carrier 47 is also driven forward at the same speed determined by the differential action of the two sets of planetary gears. This action of the gears in low speed can be determined as follows: Assume that the output shaft to which ring gear 48 and carrier 47 are attached rotate one revolution forward and that sun gear 30 has one-third as many teeth as ring gear 48. Then with carrier 49 held stationary by overrunning clutch 51, sun 30 will turn three revolutions backward. Referring now to the front set of gears, the front sun 20 is also turning three revolutions backward since it is connected to the other sun through the clutch 21 and 22. At this same time the front carrier 47 is turning one revolution forward and the problem now is to determine the number of revolutions of the front ring gear 18. Since the rotation of the front ring gear 18 can be computed from both carrier 47 and sun gear 20, the effect from each can be computed separately and the two values added to obtain the actual number of revolutions of the ring gear 18. Assuming that ring gear 18 has twice the number of teeth of sun gear 20, then three backward revolutions of the latter would turn ring gear 18, one and one-half revolutions forward if carrier 47 were stationary. But the latter turns one revolution forward which, if sun gear 20 were stationary, would turn the ring gear 18 also one and one-half revolutions forward. Therefore the ratio of the input speed to the output is 1½ plus 1½ or 3 to 1. Thus, in low gear, part of the output torque is received from ring gear 18 through planets 19 to carrier 47 while the balance of output torque is received from ring gear 18 through planets 19, sun 20, sun 30, planets 52 to ring gear 48.

In second gear the valve rod is moved to position shown in Fig. 13, valve 61 remaining open and piston 44 remaining energized as in low speed. Valve 63 now opens also which energizes piston 45 and rocks fork 34 to apply brake 43. This stops rotation of drum 29 and therefore clutch 22, cone 21 and sun 20. The planets 19 are forced to roll over the stationary sun 20 which now is the reaction member. This causes carrier 47 to rotate forward in second speed. Ring gear 48 now must rotate forward also and since sun gear 30 is connected with the sun 20 it is also stationary and carrier 49 runs forward thus overrunning brake 51 and no torque passes through this rear set of gears. Fig. 19 shows my transmission in second gear.

In high speed the valve rod position closes valves 61 and 63 and the pistons are de-energized and the brake is released by return spring 81 in Fig. 3. Valve 60 is now open which bypasses all the oil and allows the pressure to drop. Spring 23 is not held and therefore engages the cone 21 with clutch 22 which in turn engages ring gear 18, and all rotating parts then revolve as a whole with one-way brake 51 continuing to overrun. Fig. 3 shows my transmission in high gear.

For reverse, the valve rod opens valves 62 and 64. Valve 62 puts the transmission in neutral as described by taking all pressure off clutch 22 and allowing it to float freely but valve 64 energizes space 83 and piston 44 which engages the clutch with ring gear 18. This rotates drum 29 and sun 30 at engine speed. At the same time valve 64 has also moved plunger 58 to mesh dog 56 with carrier 49 which then becomes the reaction member. Planet pinions 52 then transmit to ring 48 a reverse rotation and multiplied torque. Fig. 17 shows my transmission in reverse gear.

When the selector is moved back to neutral, pistons 44 and 76 de-energize. The clutch disengages and plunger 58 is returned by spring 74. Since no torque is now being transmitted, the load in the teeth of dog 56 is removed and its return spring 73 disengages the dog.

The control or speed selector lever 92, Fig. 15, is mounted on the steering column. The lever is used to rotate a rod 94 to which is attached, under the toe board of the vehicle, lever 95. Lever 92 is pivoted in a slot in rod 94 so it can be raised and lowered slightly and is guided and limited by a slot 96 in the small housing 97 which supports lever 92. Slot 96 is shaped to stop lever 92 against the end of the lower portion of the slot in neutral and third speeds respectively. This enables the operator to feel these two positions and requires raising the lever to select reverse speed. This prevents inadvertent shifting into reverse. A foot button 98 can be arranged to move valve operating mechanism 65 to neutral at any time and thus relieve the operator from moving the selector lever by hand.

It is obvious that since torque on sun gear 20 must come from the ring gear 18, it can only be about half of the torque on ring gear 18 because the gun gear 20 has a pitch diameter only about half as large as that of the ring gear. Consequently since cone 21 and brake 43 are used to engage sun gear torque it follows that these friction members are never subjected to more than about half of engine torque. Likewise in high gear the full engine torque is divided, part of it being transmitted through the ring gear 18 teeth to the planets 19 and then to the carrier 47. The other, and preferably minor, portion of the torque is transmitted through friction to the clutch 22 and thence to the cone 21 and then to the sun gear 20 teeth, then to the planet teeth and finally to the carrier 47. Consequently, in high, also clutch 22 only carries a fraction of full engine torque. Roller clutch 51 acts as a "no back" device when the engine is stopped whether the hand lever is in neutral or not. Backward movement of the vehicle tends to turn carrier 49 backward which locks the one-way brake to the housing and tends to turn the sun gear 30 forward. But since drum 21 and clutch 22 are being held in engagement by the clutch spring there can be no relative motion and the sun gear 20 is in effect locked to the front carrier 47. The extent of the braking of the vehicle against backward motion is therefore determined by the friction of the clutch and not by the torque required to crush the locking members of the one-way brake as the load that can be applied to it is at all times limited to the capacity of the clutch and excess load would slip the clutch instead of overloading the one-way brake.

When actually driving the vehicle in high, the driver usually stops merely by taking the foot off the accelerator and applying the brake pedal. It is not necessary to shift the transmission back from high to neutral as the fluid coupling does not transmit enough torque at idling speeds to move the vehicle even with the brake released. To start again the driver then shifts to second or low and depresses the accelerator. In this way the driver is relieved, whenever stopping, of shifting to neutral and then back to low when ready to start. The only time it is advisable to shift to neutral when stopping is when the driver intends to leave his seat.

If Figs. 10 to 14 inclusive are read respectively with Figs. 17, 15, 18, 19 and 3 respectively, the operation of my transmission in various speeds will be quickly understood.

Fig. 17 shows the transmission in reverse. Clutch 22 has engaged ring gear 18 while fork 34 holds spring 23 from engaging cone 21 with clutch 22. Dog 56 is locked into carrier 49 and brake 43 is released.

In Fig. 15 the valves are in neutral position. Clutch 22 is shown free from both ring gear 18 and cone 21. Brake 43 and dog 56 are not engaged. Consequently the ring gear 18, planets 19 and sun gear 20 are the only members rotating and are merely idling.

Fig. 18 shows low speed. Clutch 22 engages cone 21 by exerting sufficient force to overcome the spring 23. This imparts reverse rotation to the sun gear 20 and sun gear 30. Brake 51 now resists backward rotation and locks carrier 49 thus turning ring gear 48 forward.

In Fig. 19 showing second speed the clutch 22 maintains the same position as in low but brake 43 now engages drum 29 thus holding sun gear 20 stationary and driving carrier 47 forward. The overrunning brake 51 now disengages automatically as ring gear 48 rotates carrier 49 forward.

Fig. 3 shows the transmission in high speed. Clutch 22 engages ring gear 18 and cone 21 because of spring 23, and the gears are therefore locked as shown in direct drive. The brake 43 and dog 56 are both disengaged and the one way brake 51 has no effect as the parts now rotate forward.

I claim:

1. A variable speed transmission comprising two sets of planetary gears, each set comprising a ring gear, a sun gear and a planet carrier supporting at least one planet gear in mesh with the sun and ring gears, a power input and a power output shaft, the ring gear of the first set being connected to the power input shaft, the planet carrier of the first set and the ring gear of the second set being connected to the output shaft, a clutch between the ring and sun gears of the first set of planetary gears, a clutch between the sun gears of the two sets of planetary gears, fluid pressure actuated means for controlling said clutches in all speeds except direct drive, and resilient means for engaging both said clutches to lock together the ring and sun gears of the first set and to lock together the sun gears of both sets whereby to effect direct drive between the power input and output shafts.

2. A variable speed transmission comprising power input and output shafts, first and second sets of planetary gears, each set comprising a ring gear, a sun gear, a planet gear carrier and at least one planet gear on said carrier in mesh with the sun and ring gears, the ring gear of the first set being fixed on the input shaft, the planet gear carrier of the first set and the ring gear of the second set being fixed to the output shaft, clutch means between the ring and sun gear of the first set, clutch means between the sun gears of both sets and between the ring gear of the first set and the sun gear of the second set, and resilient means for interengaging all of said clutches to lock together the ring and sun gears of the first set and to lock together the sun gears of both sets, and to lock together the ring gear of the first set and the sun gear of the second set whereby the ring gears of both sets, the sun gears of both sets, and the planet gears and carriers of both sets rotate as a unit to effect direct drive between the input and output shafts.

3. The combination as set forth in claim 2 including an overrunning one-way brake for controlling the rotation of the planet gear carrier for the second set, said overrunning brake locking the planet gear carrier of the second set against rotation in the opposite direction from that of the power input shaft.

4. A variable speed transmission comprising power input and output members, and first and second planetary gear sets for transmitting the drive from the input to the output member, each set comprising ring, planet, and sun gears, the ring gear of the first set being connected to the input shaft, means for releasably connecting the sun gears of both sets, the planet carrier of the first set and the ring gear of the second set being connected to the output member, and means for holding the planet carrier of the second set against rotation.

5. The combination as set forth in claim 4 wherein the last mentioned means includes an overrunning brake which locks the said planet carrier of the second set against backward rotation whereby when the sun gears of both sets are connected the transmission is in low speed.

6. The combination as set forth in claim 4 including means for locking all the gears of both sets together to rotate as a single unit with the input and output members at a one to one ratio whereby the transmission is in high speed.

7. A variable speed ratio transmission having input and output members and adapted to establish first, second and third speed ratio between said members, said transmission comprising first and second planetary gear sets, the ring gear of the first set being connected to the input member, the sun gears of both sets being connected together, the planet carrier of the first set and the ring gear of the second set being connected to the output member, releasable means for holding the planet carrier of the second set against rotation to obtain a reaction for torque multiplication in the transmission to obtain a first speed ratio through the transmission, releasable means for holding the sun gears against rotation while the second planet carrier is released to obtain the second speed ratio, and means for driving two elements of one of the sets simultaneously at the same speed as the input member while all said holding means are released to establish the third speed ratio through the transmission.

8. In a variable speed transmission comprising a first and second planetary gear set, each set comprising a ring gear, a sun gear, and at least one planet gear, an input and output member, the ring gear of the first set being connected to the input shaft, the carrier of the first set and the ring gear of the second set being connected to the output shaft, a brake for holding the carrier of the second set, clutch means for first selectively connecting an element of one gear set to an element of the other gear set whereby when said brake is applied a low speed ratio is obtained, secondly for selectively connecting two elements of the first gear set together to obtain a direct drive, and a second braking means for holding the sun gears of the first set stationary to obtain a second speed ratio drive through the transmission.

9. In a variable speed transmission, a planetary gear train consisting of a ring gear, a sun gear, planet gears and a planet carrier, a fluid servomotor including a pressure cylinder, a piston, a valve for directing fluid under pressure to said cylinder, a dog for locking an element of the planetary gearing against rotation, cam means for actuating said dog into dogging relation with said element, said cam means having a flat which engages the dog when in dogging position to positively lock the dog in engagement with said element, and resilient means between the piston of said servomotor and said cam means for transmitting power from said piston to said cam means to actuate said cam means whereby the dog is interengaged with said element.

10. The combination as set forth in claim 9 including a stop for arresting the movement of said piston before the said resilient means is fully stressed whereby only part of the power of said piston is transmitted to said cam means.

11. In a variable speed transmission including input and output members, first and second planetary gear sets for transmitting power from the input to the output member, each set comprising a sun gear, a ring gear and planet gears supported by a planet carrier, the ring gear of the first set being connected to the input member, the carrier of the first set and the ring gear of the second set being connected to the output member, clutch means for selectively connecting the sun gears of each set, for connecting the ring gear of the first set to the sun gear of the second set, and for connecting two members of the first set simultaneously at the same speed as that of the driving member.

12. A planetary transmission as described in claim 11 having releasable means for holding the planet carrier of the second set against rotation.

13. In a variable speed transmission including input and output members, first and second planetary gear sets for transmitting power from the input to the output member, each set comprising a sun gear, a ring gear and planet gears supported by a planet carrier, the ring gear of the second set being connected to the output member, means for holding the planet carrier of the second set against backward rotation to obtain a reaction, releasable means for holding the carrier of the second set against forward rotation, clutch means for selectively connecting the sun gears of each set together while the carrier of the second set is held against backward rotation to establish a first speed ratio through the transmission, for connecting the ring gear of the first set to the sun gear of the second set while the carrier of the second set is held against forward rotation and the sun gear of the first set is released from the sun gear of the second set to establish a reverse speed ratio through the transmission, and for connecting two members of the first set together at the same speed as that of the driving member while the second carrier is released for rotation, to establish a one to one speed ratio through the transmission.

14. A planetary transmission described in claim 13 having means for holding the sun gear of the first set against backward rotation while the carrier of the second set is released to allow forward rotation whereby a second speed ratio drive through the transmission is established.

15. In a transmission, including an input shaft, an output shaft, a first and second set of planetary gears each comprising a sun gear, a ring gear and planet gears supported by a planet carrier, the ring gear of the first set being connected to the input shaft, the planet carrier of the first set and the ring gear of the second set being connected to the output shaft, clutch means releasably connecting the sun gears together, releasable means for holding the carrier of the second set against backward rotation to obtain a reaction for torque multiplication in the transmission to obtain a first speed ratio with both of the said sets of gears having their teeth under load and transmitting torque to the output shaft.

16. A planetary transmission described in claim 15 having braking means for holding the sun gear of the first set of planetary gears against backward rotation to obtain a reaction, the carrier of the second set being released for forward rotation, whereby a second speed ratio is obtained through the first set of planetary gears alone, the second set of planetary gears turning idly without loaded teeth.

17. In a variable speed transmission including an input and output shaft, a first and second set of planetary gears, each comprising a sun gear, a ring gear and planet gears supported on a planet carrier, means for connecting the sun gear of the second set of gears to the ring gear of the first set, the carrier of the first set and the ring gear of the second set being connected to the output shaft, means for holding the carrier of the second set against forward rotation to obtain a reaction for torque multiplication through the transmission, the sun gear of the first set being released for free rotation, whereby a reverse speed ratio is obtained through the second set of the planetary gears, the first set of gears turning idly without loaded teeth.

HOWARD W. SIMPSON.

REFERENCES CITED

The following references are of record in the file of this patent:

UNITED STATES PATENTS

| Number | Name | Date |
|---|---|---|
| 1,607,986 | Jones et al. | Nov. 23, 1926 |
| 2,085,668 | Mueller | June 29, 1937 |
| 2,099,140 | Patterson | Nov. 16, 1937 |
| 2,136,971 | Fleischel | Nov. 15, 1938 |
| 2,251,625 | Hale | Aug. 5, 1941 |
| 2,324,713 | McFarland | July 20, 1943 |
| 2,332,593 | Nutt et al. | Oct. 26, 1943 |
| 2,349,410 | Normanville | May 23, 1944 |
| 2,352,004 | Pollard | June 20, 1944 |
| 2,354,257 | Greenlee | July 25, 1944 |
| 2,377,696 | Kelley | June 5, 1945 |

FOREIGN PATENTS

| Number | Country | Date |
|---|---|---|
| 428,415 | Great Britain | May 13, 1935 |
| 477,530 | Great Britain | Jan. 3, 1938 |
| 513,274 | Great Britain | Oct. 9, 1939 |
| 614,340 | France | Dec. 11, 1926 |
| 790,453 | France | Nov. 21, 1935 |